Aug. 9, 1927.
E. ROUĆKA
1,638,102
MEASURING SYSTEM
Filed July 17, 1922
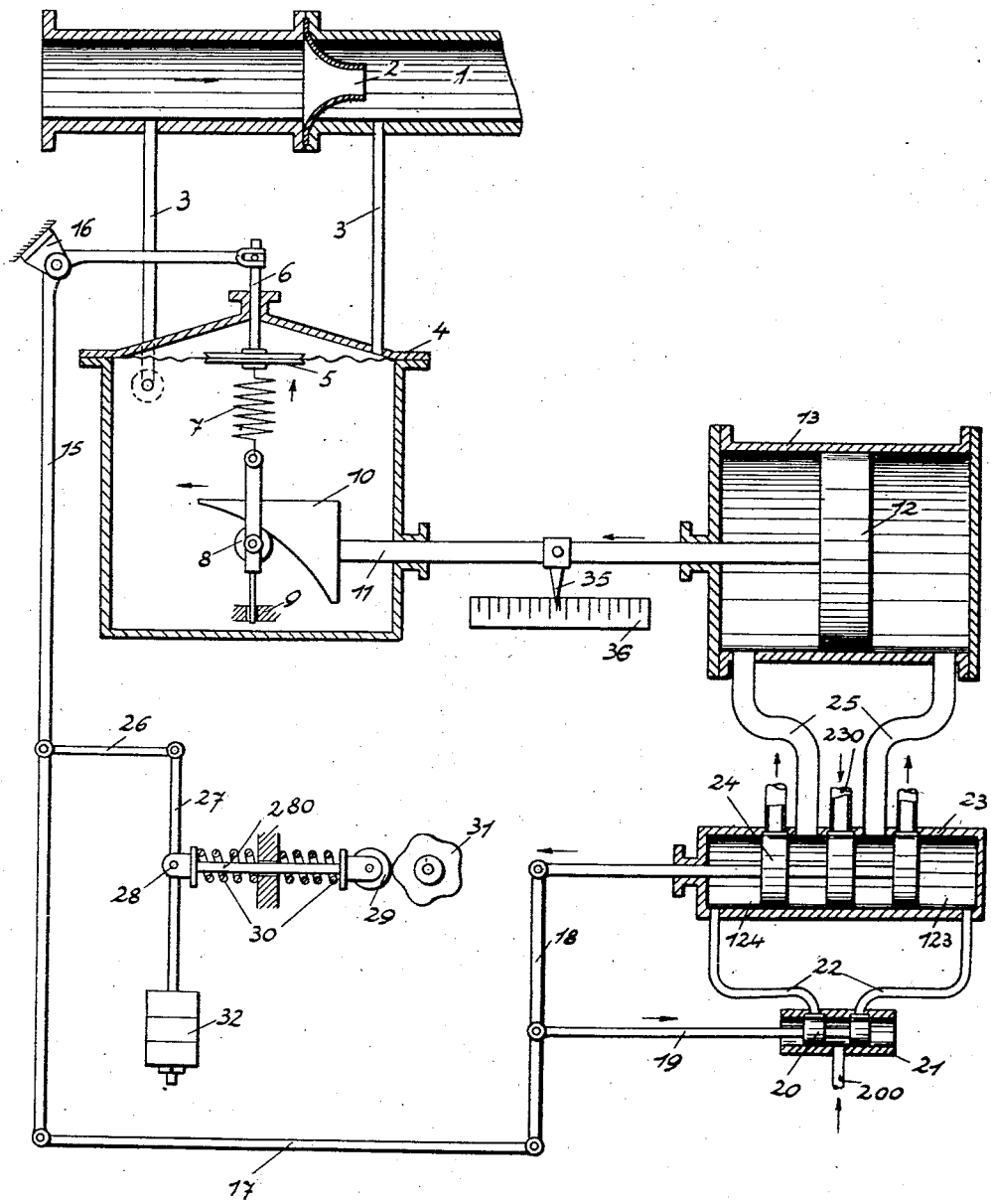
INVENTOR:
Erich Roućka,
BY
Everett + Rook,
ATTORNEYS.

Patented Aug. 9, 1927.

1,638,102

UNITED STATES PATENT OFFICE.

ERICH ROUČKA, OF BLANSKO, CZECHOSLOVAKIA.

MEASURING SYSTEM.

Application filed July 17, 1922, Serial No. 575,755, and in Czechoslovakia August 30, 1921.

This invention relates in general to a system similar to that disclosed in my co-pending application Serial No. 575,753, filed July 17, 1922, for measuring any physical or chemical quantity, quality value or condition, such as flow of fluid, fluid pressure, composition of fluids, temperature, electrical quantities, etc., by means of auxiliary mechanical energy.

The system comprises in general means actuated by or sensitive to the value to be measured, means mechanically cooperating with said first-mentioned means for compensating or balancing the same, a governor for controlling said second-mentioned means, and means responsive to departures from balance between said first two-mentioned means for actuating said governor. The value being measured may act in the said sensitive means as a mechanical force, or as the variable position of a movable member, and a mechanical force produced by a spring, weight, centrifugally, etc., or the position of a movable member actuated by auxiliary power cooperates with said first-mentioned force or position of the movable member in said sensitive means to compensate or balance the same. The measure is the position of the movable member produced by the auxiliary energy.

The balancing condition or force may be continuously or uninterruptedly produced to cooperate with the said means actuated by the value to balance the same, or said balancing force may be caused to cooperate periodically or at intervals with said second-mentioned means, for example, for periods of ten, twenty, thirty seconds, etc., during which periods the measuring takes place.

The objects of the invention are to provide in such a system means for producing slight motion or vibrations of the relatively movable slidably cooperating parts to reduce friction therebetween and increase accuracy and sensitivity; to provide in such a system the combination with a motor actuated by auxiliary power for producing the balancing condition, of a governor for said motor and a relay motor to actuate said governor; to provide means between the means sensitive to the value and the balancing condition for producing a special and definite relation between the variations in value and the movement of the movable member; to provide in a system of this character a fluid motor for actuating the measuring movable member; and to obtain other results and advantages as may be brought out by the following description.

In the accompanying drawing the figure is a diagrammatic illustration of a system embodying my invention.

The value to be measured is shown as the flow of a fluid flowing through a conduit 1 having a flow resisting device 2 therein. Pipes 3 are connected to the conduit 1 at opposite sides of the flow resistance device 2 and to a diaphragm chamber 4 at opposite sides of a diaphragm 5. The said diaphragm is thus actuated by or sensitive to variations or differences in pressure of the fluid on opposite sides of the flow resistance device 2.

The diaphragm is provided with a rod 6 having a pin and slot connection with one arm of a bell crank lever 15 pivotally mounted to a fixed support 16 and pivotally connected at its other end to one end of a link 17, the opposite end of which is pivotally connected to one end of a link 18, the other end of which is pivotally connected to the piston rod of a piston 24 mounted in a cylinder 23 of a relay governor and motor therefor. The relay governor controls the flow of auxiliary fluid to and from a fluid motor comprising the cylinder 13 and piston 12 through pipes 25. The action of the relay motor is controlled by a governor valve comprising a valve piston 20 mounted in a cylinder 21, the piston rod 19 of said valve piston being connected to the link 18 so as to be actuated by movements of the diaphragm 5.

The piston rod 11 of the piston 12 of the fluid motor carries a cam block 10 which engages a roller 8 mounted in a carriage slidable in a fixed support 9 within the diaphragm chamber 4, the carriage of said roller 8 being connected to one end of a spring 7, the opposite end of which is connected to the side of the diaphragm 5 opposite the rod 6. The force of the spring 7 cooperates with the force actuating the diaphragm 5 to compensate or balance the same.

When the system is in balanced condition, that is, when the forces acting on opposite sides of the diaphragm 5 are balanced, the governor valve piston 20 is in neutral position and prevents the flow of fluid to or from the chambers 123, 124 of the relay motor, and the piston 24 of the relay motor and governor is in its neutral position so as to prevent flow of liquid to or from the main fluid motor 12 or 13. Upon a departure from balance in the system, such as differences in pressure on opposite sides of the flow resistance device 2. the diaphragm 5 is actuated in one direction or the other and in turn swings the bell crank lever 15 (which is thus responsive to such departures from balance) so as to move the link 18 about its pivotal connection with the rod of the piston 24, thereby moving the governor valve piston 20 in one direction to admit fluid to one of the chambers 123 or 124 of the relay motor from a supply pipe 200, and from the other of said chambers. The piston 24 is thus moved in one direction and admits fluid from a supply pipe 230 to one side of the piston 12 and from the other side thereof. The piston 12 is thus moved in one direction and actuates the cam block 10 relatively to the roller 8 so as to vary the tension of the spring 7 and balance the force actuating the diaphragm 5. Movement of the piston 24 also swings the link 18 about its pivotal connection with the link 17 so as to return the valve piston 20 to its neutral position and restore balance in the system. The movement of the piston 12, piston rod 11 and cam block 10 is a measure of the flow of fluid in the conduit 1, and a pointer 35 is mounted on the piston rod 11 to cooperate with a scale 36 to measure the said flow of fluid. The cam surface of the block 10 is for producing a special and definite relation, for instance a quadratic relation, between the flow of fluid in the conduit 1 and the movement of the piston 12, this relation being determined by the form of the cam surface engaging the roller 8.

For the purpose of reducing friction between the relatively movable slidably cooperating parts of the system and thereby increase the accuracy and sensitivity thereof, I may pivotally connect one end of a link 26 to one arm of the bell crank lever 15 and the other end to one end of a lever 27 pivotally mounted at 28 intermediate its ends on one end of a rod 280. The rod 280 is slidable in a fixed support and has compression springs 30 interposed between opposite ends thereof and said support. The end of said rod opposite the pivotal connection 28 is provided with a roller 29 maintained in constant engagement with a rotating cam 31, and counter weights 32 are applied to the end of the lever 27 opposite its connection with the link 26. With this construction the rotating cam 31 produces rapid longitudinal movements or vibrations in the rod 280 which are transmitted through the lever 27, link 26, lever 15 and links 17 and 18 to the pistons 20 and 24 of the governor valve and the relay governor so as to reduce the friction between said pistons and their cylinders. Vibrations are also transmitted to the rod 6 of the diaphragm to reduce friction between the same and the walls of the chamber 4, and through the diaphragm 5, spring 7, roller 8 and cam 10 to the piston 12.

It will thus be observed that the flow of fluid in the conduit 1 is measured by auxiliary energy through the fluid motor 12, 13, which varies the position of the movable member or pointer 35. The cam 10 produces a special and definite relation between the magnitude of the flow of fluid and the movement of the movable member, and the motor 12, 13, block 10, roller 8 and spring 7 cooperate with the diaphragm 5 to maintain balance in the system. Obviously, the lever 15 and links 17 and 18 are responsive to departures from balance of the forces exerted on the diaphragm.

While I have shown the system embodying mechanisms of certain detail constructions it will be understood that this is mainly for illustrating the principles thereof, and that many modifications and changes in the detail mechanism may be made without departing from the spirit or scope of the invention. For instance, should it be desired to measure other values than fluid flow, suitable means sensitive to the desired value could be provided by those skilled in the art instead of the flow resisting device and the diaphragm and casing 2 and 1. Therefore, I do not wish to be understood as restricting myself except as required by the following claims when construed in the light of the prior art.

Having thus described the invention, what I claim is:

1. A measuring system of the character described in which the position of a movable member is varied as a measure in accordance with a variable value, said system comprising movable means sensitive to variations in the magnitude of said value, including a plurality of relatively movable slidably cooperating parts, means including a plurality of relatively slidable parts and actuated by auxiliary energy for exerting a mechanical force upon said first-mentioned means to balance the latter, governing means for controlling the application of said auxiliary energy to said second-mentioned means to vary said force including a plurality of relatively slidable parts, means responsive to departures from balance of said first two-mentioned means due to variations in said value including a plurality of slidably cooperating parts for actuating said governing means, one of said relatively movable slidably cooperating parts of each of said four-mentioned means being operatively connected to one of said parts of one of the others of said four-mentioned means, and means for vibrating one of said parts to produce relative vibration of all of said slidably cooperating parts to reduce friction therebetween.

2. A measuring system of the character described, comprising movable means sensitive to variations in the magnitude of a value to be measured, means for mechanically cooperating with the first-mentioned means to balance the latter, a motor for actuating said second-mentioned means, a motor-operated relay governor for controlling the supply of motive medium to said motor, a governor for controlling the supply of motive medium to said relay governor, means responsive to departures from balance of said said first two-mentioned means due to variations in said value, an operative connection between said last-mentioned means and said second-mentioned governor for actuating the second-mentioned governor, and means actuated in accordance with said second-mentioned means for indicating said variations in said value.

3. A measuring system of the character described in which the position of a movable member is varied as a measure in accordance with a variable value, said system comprising movable means sensitive to variations in the magnitude of said value, means for exerting a mechanical force upon the first-mentioned means to balance the latter, a motor, governing means for said motor, means responsive to departures from balance of said first two-mentioned means for actuating said governing means, a movable member actuated by said motor the position of which is a measure for said value, means for varying the force exerted by the second-mentioned means upon said first-mentioned means for producing a special and definite relation between variations in said value and the movement of said movable member, and means connecting the last-mentioned means with said motor for actuation thereby.

4. A measuring system of the character described in which the position of a movable member is varied as a measure in accordance with a variable value, said system comprising movable means sensitive to variations in the magnitude of said value, a tension spring exerting a variable mechanical force upon the first-mentioned means to balance the latter, a motor, governing means for said motor, means responsive to departures from balance of said first two-mentioned means for actuating said governor, a movable member actuated by said motor the position of which is a measure of said value, a device operatively connected to and actuated by said motor and having a cam surface, and an operative connection between said spring and said device whereby said cam surface upon movement of said device varies the force exerted by said spring upon the first-mentioned means to produce a special and definite relation between variations in said value and movement of said movable member.

ERICH ROUČKA.